US008543320B2

(12) United States Patent
Zheng et al.

(10) Patent No.: US 8,543,320 B2
(45) Date of Patent: Sep. 24, 2013

(54) INFERRING A BEHAVIORAL STATE OF A VEHICLE

(75) Inventors: Yu Zheng, Beijing (CN); Xing Xie, Beijing (CN)

(73) Assignee: Microsoft Corporation, Redmond, WA (US)

( * ) Notice: Subject to any disclaimer, the term of this patent is extended or adjusted under 35 U.S.C. 154(b) by 199 days.

(21) Appl. No.: 13/111,110

(22) Filed: May 19, 2011

(65) Prior Publication Data

US 2012/0296560 A1 Nov. 22, 2012

(51) Int. Cl.
*G06F 19/00* (2011.01)
*G06G 7/76* (2006.01)

(52) U.S. Cl.
USPC .......................................... 701/119; 701/117

(58) Field of Classification Search
USPC ................. 701/117, 118, 119; 340/989–994; 705/14.63, 28
See application file for complete search history.

(56) References Cited

U.S. PATENT DOCUMENTS 5,442,559 A * 8/1995 Kuwahara et al. ............ 701/446
5,552,990 A * 9/1996 Ihara et al. .................... 701/446
5,917,434 A 6/1999 Murphy
6,023,653 A * 2/2000 Ichimura et al. .............. 701/446
6,249,740 B1 * 6/2001 Ito et al. ........................ 701/420
6,581,005 B2 6/2003 Nakayama et al.
6,615,133 B2 * 9/2003 Boies et al. ................... 701/533
7,598,889 B2 * 10/2009 Maeda et al. ............ 340/995.27
7,809,500 B2 * 10/2010 Couckuyt et al. ............. 701/445
7,835,953 B2 11/2010 Chen et al.
8,032,299 B2 * 10/2011 Fernandez Hernandez et al. ............................. 701/436
8,073,619 B2 * 12/2011 Hattori et al. ................. 701/445
8,180,566 B2 * 5/2012 Kobayashi .................... 701/411
2004/0215381 A1 * 10/2004 Jitsui et al. ...................... 701/45
2010/0106603 A1 4/2010 Dey et al.
2012/0256770 A1 * 10/2012 Mitchell ....................... 340/989

OTHER PUBLICATIONS

Bejan et al., "Statistical Modelling and Analysis of Sparse Bus Probe Data in Urban Areas", 13 International IEEE Conference on Intelligent Transportation Systems, Madeira Island, Portugal, Sep. 19-22, 2010, 8 pages.
Coa et al., "From GPS Traces to a Routable Road Map", ACM GIS '09, Seattle, WA, Nov. 4-6, 2009, 10 pages.
Chandrasekaran et al., "Vehicular Speed Estimation using Received Signal Strength from Mobile Phones", UbiComp'10, Copenhagen, Denmark, Sep. 26-29, 2010, 4 pages.

(Continued)

*Primary Examiner* — Thomas Tarcza
*Assistant Examiner* — Tyler J Lee
(74) *Attorney, Agent, or Firm* — Lee & Hayes, PLLC

(57) ABSTRACT

Trajectory data representing tracked positions of a vehicle along a trajectory having a start and end point is accessed. The trajectory data may include spatio-temporal information about the vehicle at different points along the trajectory. The trajectory may be divided into segments based, at least in part, on knowledge of inferred-parking locations. The segments may be map-matched to corresponding road segments. Additionally, historical data representing spatio-temporal travel patterns of vehicles learned from historical trajectories of vehicles corresponding to the map-matched-road segments may also be accessed. A behavioral state of the vehicle for a segment or position within a segment may be inferred, based at least in part, on (i) the vehicle's spatio-temporal information corresponding to the segment or position within a segment, (ii) knowledge of the map-matched-road segment, and (iii) the historical data.

20 Claims, 10 Drawing Sheets

(56) References Cited

OTHER PUBLICATIONS

Ge et al., "An Energy-Eficient Mobile Recommender System", KDD'10, Washington, DC, Jul. 25-28, 2010, 9 pages.
Guhnemann et al., "Monitoring Traffic and Emissions by Floating Car Data", Institute of Transport Studies (ITS), Working Paper ITS-WP-04-07, Australia, Mar. 2004, 19 pages, << http://ws.econ.usyd.edu.au/itls/wp-archive/itls_wp_04-07.pdf >>.
Herrera et al., Evaluation of traffic data obtained via GPS-enabled mobile phones: The Mobile Century field experiment', Transportation Research Part C, vol. 18, 2010, pp. 568-583.
Herring et al., "Estimating arterial traffic conditions using sparse probe data", 13 International IEEE Conference on Intelligent Transportation Systems, Madeira Island, Portugal, Sep. 19-22, 2010, 8 pages.
Kim et al., "Discovering Semantically Meaningrul Places from Pervasive RF-Beacons", UbiComp 2009, Orlando, Florida, Sep. 30-Oct. 3, 2009, 10 pages.
Krumm et al., "LOCADIO: Inferring Motion and Location from Wi-Fi Signal Strengths", 1st Annual International Conference on Mobile and Ubiquitous Systems: Networking and Services (Mobiquitous 2004), Boston, Massachusetts, Aug. 22-26, 2004, 10 pages.
Krumm et al., "Predestination: Inferring Destinations from Partial Trajectories", 8th International Conference on Ubiquitous Computing (UbiComp 2006), Orange County, California, Sep. 17-21, 2006, 18 pages.
Lee et al., "Analysis of the passenger pick-up pattern for taxi location recommendation", 4th International Conference on Networked Computing and Advanced Information Management (NcCM'08), Gyeongju, Korea, Sep. 2-4, 2008, pp. 199-204.
Li et al., "Hierarchical Route Planning Based on Taxi GPS-Trajectories", 17th International Conference on Geoinformatics, Fairfax, VA, Aug. 12-14, 2009, 5 pages.
Liao et al., "Learning and Inferring Transportation Routines", 19th National Conference on Artificial Intelligence, American Association for Artificial Intelligence (AAAI), San Jose, California, Jul. 25-29, 2004, 6 pages.
Lou et al., "Map-Matching for Low-Sampling-Rate GPS Trajectories", 17th International Conference on Advances in Geographic Information Systems (ACM SIGPATIAL GIS 2009), Seattle, WA, Nov. 4-6, 2009, 10 pages.
Lui et al., "Uncovering cabdrivers' behavior patterns from their digital traces", Computers, Environment and Urban Systems, vol. 34, Issue 6, Nov. 2010, pp. 541-548, retrieved Dec. 2, 2010 at << http://www.sciencedirect.com >>.
Patterson et al., "Inferring High-Level Behavior from Low-Level Sensors", 5th International Conference on Ubiquitous Computing (UbiComp 2003), Seattle, WA, Oct. 12-15, 2003, 18 pages.
Silva et al., "A Location-Based Service Application for a Mobile Computing Environment", Simulation, vol. 79, Issue 5-6, May-Jun. 2003, pp. 343-360.
Sohn et al., "Mobility Detection Using Everyday GSM Traces", 8th International Conference on Ubiquitous Computing (UbiComp '06), Newport Beach, CA, Sep. 17-21, 2006, pp. 212-224.
Yoon et al., "Smart Itinerary Recommendation based on User-Generated GPS Trajectories", 7th International Conference on Ubiquitous Intelligence and Computing, (UIC 2010), Xi'an, China, Oct. 26-29, 2010, 15 pages.
Yuan et al., "An Interactive-Voting Based Map Matching Algorithm", 11th International Conference on Mobile Data Management (MSM 2010), Kansas City, MO, May 23-26, 2010, 10 pages.
Yuan et al., "T-Drive: Driving Directions Based on Taxi Trajectories", 18th International Conference on Advances in Geographic Information Systems (ACM GIS 2010), San Jose, CA, Nov. 2-5, 2010, 10 pages.
Zheng et al., "Learning Location Correlation from GPS Trajectories", Mobile Data Management (MDM'2010), Kansas City, Missouri, May 23-26, 2010, pp. 27-32.
Zheng et al., "Learning Transportation Mode from Raw GPS Data for Geographic Applications on the Web", WWW 2008 / Referred Track; Mobility, Beijing, China, Apr. 21-25, 2008, 10 pages.
Zheng et al., "Mining Interesting Locations and Travel Sequences from GPS Trajectories", WWW 2009, Madrid, Spain, Apr. 20-24, 2009, pp. 791-800.
Zheng et al., "Recommending Friends and Locations Based on Individual Location History", ACM Trans. Assian Language Info. Processing, vol. 6, No. 3, Article 9, Nov. 2007, 47 pages.
Zheng et al., "Understanding Mobility Based on GPS Data", UbiComp'08, Seoul, Korea, Sep. 21-24, 2008, 10 pages.
Zheng et al., "Understanding Transportation Modes Based on GPS Data for Web Applications", ACM Transactions on The Web, vol. 4, No. 1, Article 1, Jan. 2010, 36 pages.
Ziebart et al., "Navigate Like a Cabbie: Probabilistic Reasoning from Observed Context-Aware Behavior", UbiComp'08, Seoul, Korea, Sep. 21-24, 2008, 10 pages.

* cited by examiner

INFERRING A BEHAVIORAL STATE OF A VEHICLE

BACKGROUND

Cities on this planet are facing immense challenges with continually increasing population growth. Urbanization is increasing at a faster pace than ever in many developing countries, while some modern cities in developed countries are engaging in reconstruction, urban renewal, and suburbanization. These phenomenal changes are posing severe challenges for fragile urban transportation systems and effective land use planning.

SUMMARY

In one example, trajectory data representing tracked positions of a vehicle along a trajectory having a start and end point is accessed. The trajectory data may include spatio-temporal information about the vehicle at different points along the trajectory. The trajectory may be divided into segments based, at least in part, on knowledge of inferred-parking locations. The segments may be map-matched to corresponding road segments. Additionally, historical data representing spatio-temporal travel patterns of vehicles learned from historical trajectories of vehicles corresponding to the map-matched-road segments may also be accessed. A behavioral state of the vehicle for a segment or position within a segment may be inferred, based, at least in part, on (i) the vehicle's spatio-temporal information corresponding to the segment or position within a segment, (ii) knowledge of the map-matched-road segment, and (iii) the historical data.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The term "techniques," for instance, may refer to device(s), system(s), method(s) and/or computer-readable instructions as permitted by the context above and throughout the document.

BRIEF DESCRIPTION OF THE DRAWINGS

The detailed description is described with reference to the accompanying figures. In the figures, the left-most digit(s) of a reference number identifies the figure in which the reference number first appears. The same numbers are used throughout the drawings to reference like features and components. Drawings are not drawn to scale.

DETAILED DESCRIPTION

Figure 1:
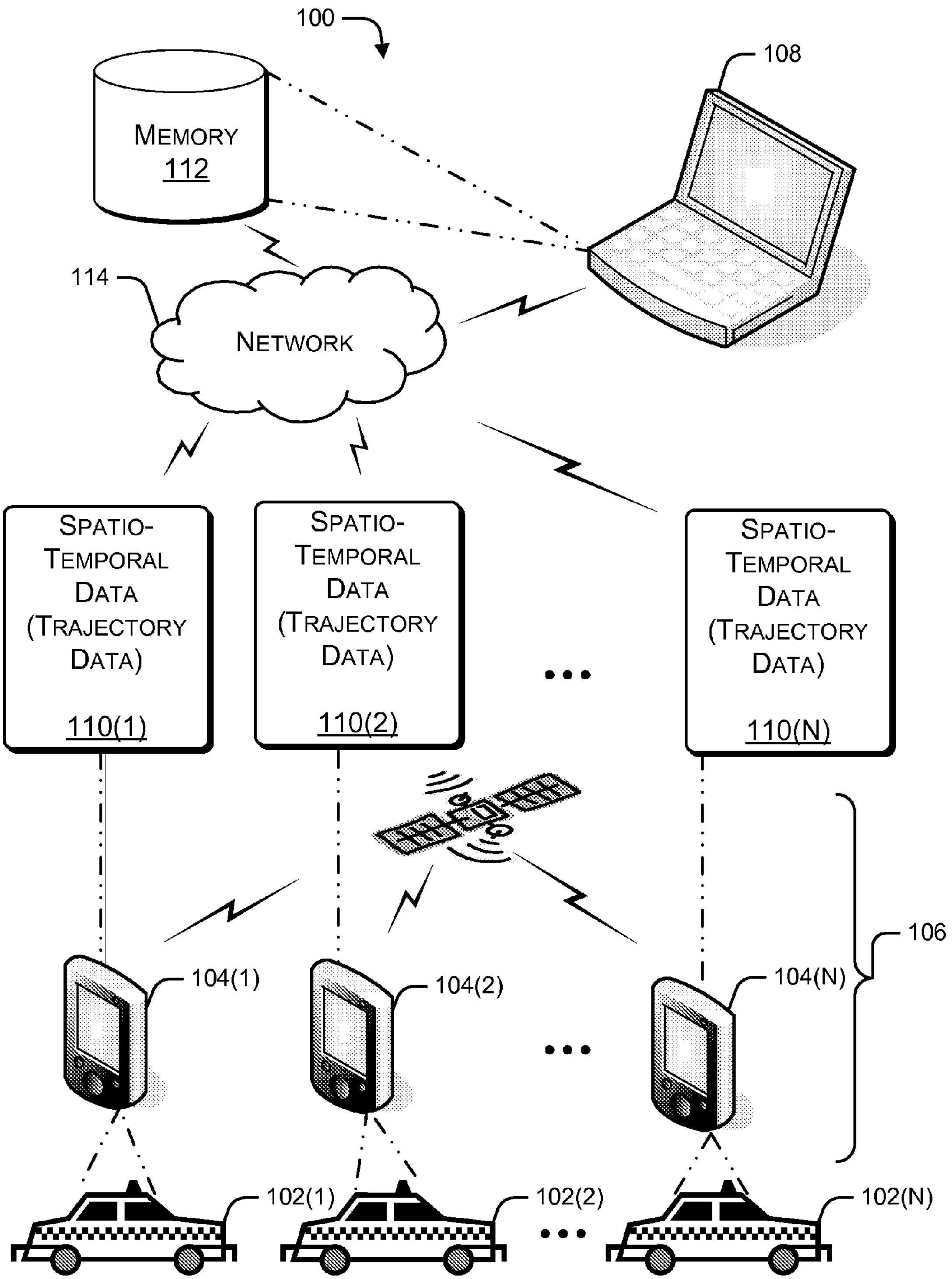
FIG. 1 illustrates an example environment in which a behavior state of a vehicle may be inferred.

Described herein are techniques to automatically infer the behavioral state of passenger-transportation vehicles, such as taxis. Specifically, in one example, an inference is made whether a taxi is occupied (i.e., transporting at least one passenger), unoccupied (i.e., operating with no passengers), or is parked. By inferring particular-behavioral states of a vehicle, it is possible to more accurately sense traffic flow and mobility patterns of people in an urban environment, among other uses.

In one embodiment, a taxi equipped with a navigation system tracks the position of the taxi. The tracked position of the taxi is recorded at regular intervals revealing trajectories of the taxi. Specifically, the time of day, direction, speed, and location of the taxi at different points along the trajectories are recorded. The recorded data is then analyzed to deduce what behavioral states the taxi is in while traversing an urban area.

In one aspect, when attempting to understand traffic flows and mobility patterns of people, trajectories of taxis transporting passengers are analyzed in lieu of trajectories representing taxis in an unoccupied state (i.e., not transporting at least one passenger). Analyzing trajectories of taxis transporting passengers reveal traffic flows and mobility of passengers more accurately than trajectories of taxis in an unoccupied state. For instance, taxis searching for a fare typically drive slower than taxis transporting a passenger, even if traffic conditions allow for faster speeds. Further, taxis searching for a fare often drive in patterns not necessarily reflective of mobility patterns of people.

On the other hand, understanding when a taxi is unoccupied can help taxi companies conserve energy and resources. For example, a taxi dispatcher can send a passenger's pick-up request to unoccupied taxis rather than all taxis.

Additionally, by automatically inferring the state of a taxi, the fleet operator of a taxi company is able to monitor not only the movement of each taxi but also identify higher-performing and poorer-performing drivers, based on understanding which drivers' taxis have a higher proportion of recorded operation while in an occupied state than those in an unoccupied state.

Still further, awareness of the state of a taxi can be relied on to facilitate context-aware computing. For instance, some location-based advertisement can be pushed to a taxi only when it has passengers. Also, the fleet operator of a taxi company may identify drivers who provide passengers rides without charging a fare, or who pocket a fare without accounting to the taxi company.

So, by understanding the state of a taxi—such as, whether occupied, unoccupied, or parked—it is possible to sense traffic flow and mobility of vehicles in an urban environment. Knowledge of the state of taxis may also facilitate better management of taxis, and for performing other acts, such as pushing content to the vehicle, only when the vehicle is occupied.

Although some of the discussion herein focuses on behavioral states of taxis as the sample vehicle, methodologies and principles described herein are not necessarily limited to taxis, and may be applied to other vehicles to infer different behavioral states.

FIG. 1 illustrates an example environment 100 within which a behavior state of a vehicle may be inferred, such as whether the vehicle is transporting a passenger, operating without passengers, or is waiting at a parking location. Example environment 100 includes vehicles 102(1), 102(2), . . . 102(N).

Each vehicle, referred to generally as reference number 102, may be equipped with a transmitting device 104(1), 104(2), . . . 104(N) on or inside vehicle 102. Examples of a transmitting device, referred to generally as reference number 104, may include, but are not limited to, a portable Global Positioning System (GPS) device, a mobile-computing device, a mobile phone, passive or active radio transmitters, and an in-car-navigation system.

Each transmitting device 104 tracks the position of a vehicle. Specifically, each transmitting device 104 records spatio-temporal data 110(1), 110(2), . . . , 110(N), respectively, indicating the history of a vehicle's speed, position, and time at various points along the vehicle's trajectory. The spatio-temporal data is also referred to interchangeably throughout this disclosure as "trajectory data."

Each transmitting device 104 records spatio-temporal data 110 by communicating with a GPS system 106, or any satellite-positioning system. In another embodiment, transmitting devices 104 may communicate with other suitable location-tracking technology, such as Radio-frequency identification (RFID) systems (not shown).

In one embodiment, each transmitting device 104 transmits tracked positions of a vehicle, such as the spatio-temporal data 110, to memory 112 accessible by a computer 108. For example, spatio-temporal data 110 may be transmitted over a network 114 to memory 112. Network 114 may be any type of communication network, including, but not limited to, the Internet, a wide-area network, a local-area network, a satellite communication network, a cellular-telephone-communications network, or a communications interface, or a combination of the foregoing. Alternatively, spatio-temporal data 110 may be transmitted to an intermediary device (e.g., a universal serial bus (USB) storage device), which is then used to transfer the data to a computer 108 or other intermediary devices.

Figure 2:
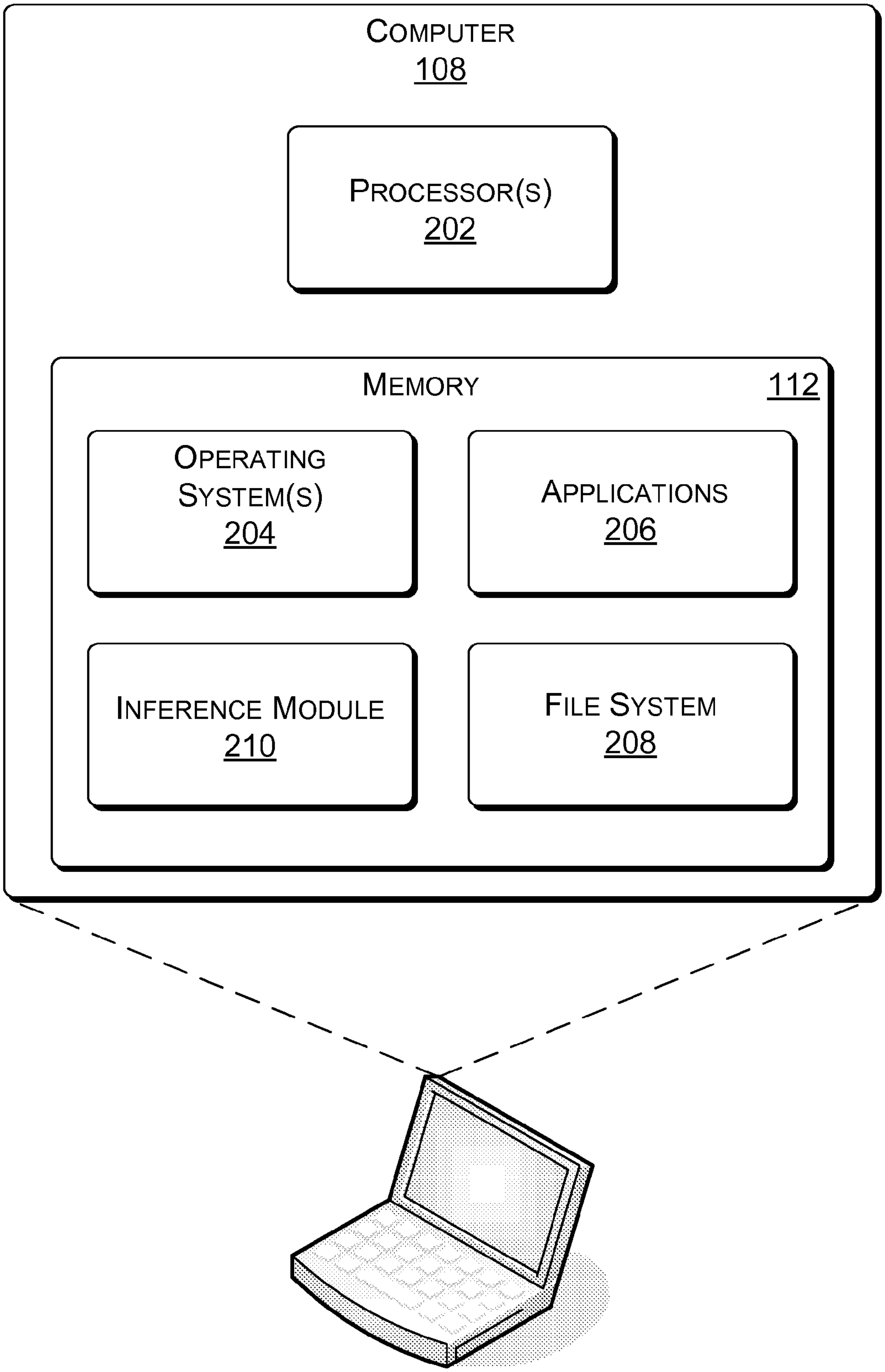
FIG. 2 is a block diagram illustrating select components of an example computer that is configured to infer a behavioral state of a vehicle in the example architecture of FIG. 1.

FIG. 2 is a block diagram illustrating select components of an example computer 108 that is configured to infer a behavioral state of a vehicle in the example architecture 100 of FIG. 1. Computer 108 may represent any suitable computing device having one or more processors 202 and the ability to access memory 112. Examples of computer 108 may include, but are not limited to, a personal computer, a mobile computer, notepad, server, or distributed-computer systems. Further, although not shown, any number of system busses, communication and peripheral interfaces, input/output devices, and other devices may be included in computer 108, as appreciated by those skilled in the art.

Memory 112 may include any suitable computer-storage media including volatile and non-volatile memory, and any combination thereof. For example, computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device.

In contrast, communication media may embody computer readable instructions, data structures, program modules, or other data in a modulated data signal, such as a carrier wave, or other transmission mechanism. As defined herein, computer-storage media does not include communication media.

Further, memory 112 may be local and/or offsite to computer 108. For instance, one or more portions of, or all of spatio-temporal data 110 stored in memory 112, may be accessed from a computer-storage medium local to computer 108 and/or remote (not shown) to computer 108, such as from a storage medium connected to network 114.

Resident in memory 112 are one or more operating systems 204, and any number of other program applications 206, which are executed on processor 202 to enable processing of spatio-temporal data 110 or other functionality.

A file system 208 may reside as a component in the form of computer-executable instructions and/or logic within memory 112, that when executed serves as a logical interface between code stored in memory 112. File system 208 may also assist in storing, retrieving, organizing files, and performing other related tasks associated with code and/or data. That is, file system 208 has the ability to read, write, erase, and manage files.

Resident in and/or accessible to computer 108 is an inference module 210 configured to automatically infer a behavioral state of a vehicle at different tracked positions along a historical trajectory of a vehicle, based in part, on spatio-temporal data 110 accessed from memory 112. Although illustrated in FIG. 2 as being stored in memory 112 of computer 108, inference module 210, or portions thereof, may be implemented using any form of computer-readable media accessible by computer 108.

For example, inference module 210 may be implemented as code in the form of computer-readable instructions that execute on one or more processors 202. For purposes of illustration, programs and other executable-program modules are illustrated herein as discrete blocks, although it is recognized that such programs and components may reside at various times in different storage components. Further, such code may be implemented as one or more applications or modules, or may be integrated as components within a single application.

In one embodiment, inference module 210, infers behavior states of a taxi, which may include a parking state (P), an occupied state (O) (i.e., transporting a passenger), or an unoccupied state, also referred to as non-occupied (N), (i.e., not transporting a passenger). Again, inferring behavior states of a taxi contributes to identifying the real mobility of people, and the estimation of real-time traffic flows on road surfaces. Other potential features, not repeated here, may be realized as mentioned above and herein.

Introductory Terminology

Before discussing inference module 210 in more detail, below is an introduction to some terminology used in this disclosure.

"Road Segment (r)" refers to a directed edge that is associated with a direction symbol (r.dir, one-way or two-way), two terminal points (r.s, r.e), and a list of intermediate points describing the segment using a polyline. Additional information is maintained for each road segment: level (r.level) and length (r.length). For example, a highway's level is usually 0 and that of a ring road in a city is 1.

"Road Network ($G_r$)" refers to a directed graph, $G_r=(V_r, E_r)$, where $E_r$ is the set of edges representing road segments, and $V_r$ is a collection of terminal points of corresponding road segments.

"A taxi trajectory (Taxi Trajectory (Traj)"—also referred to as a "trajectory"—is denoted as a sequence of GPS points (or location points), i.e., Traj: $p_1 \rightarrow p_2 \rightarrow \ldots \rightarrow p_n$. Each point is represented as $p_i=(l, t, v, s)$, where l denotes the location of a taxi at time t, travelling with (instantaneous) speed of v, and given state s. Note again that the state s of a taxi may be occupied (O), not-occupied (N), or parked (P).

Given a trajectory, Traj: $p_1 \rightarrow p_2 \rightarrow \ldots \rightarrow p_n$, a "Parking Location (Pk)" (also referred to as a "parking place") is a sub-trajectory Traj: $p_i \rightarrow \ldots \rightarrow p_j$, which satisfies the conditions where $\forall k \in [i, j)$, distance$(p_k, p_{k+1})<\delta$, $t_j-t_i>\tau$ and speed $(p_i)<\epsilon$. Thus, a parking location may include any location in which a taxi has stayed and/or queued for a while with the intention to eventually pick-up a passenger, or it may also indicate a situation when a taxi driver is taking a break. Thus, a "parking location," as used herein is not merely limited to a parking lot or parking garage. A "taxi segment" is a sub-trajectory between two parking places. A taxi segment could contain one or more trips. In other words, each segment includes one or more sub-trajectories between two parking locations.

Example Inference Module

Figure 3:
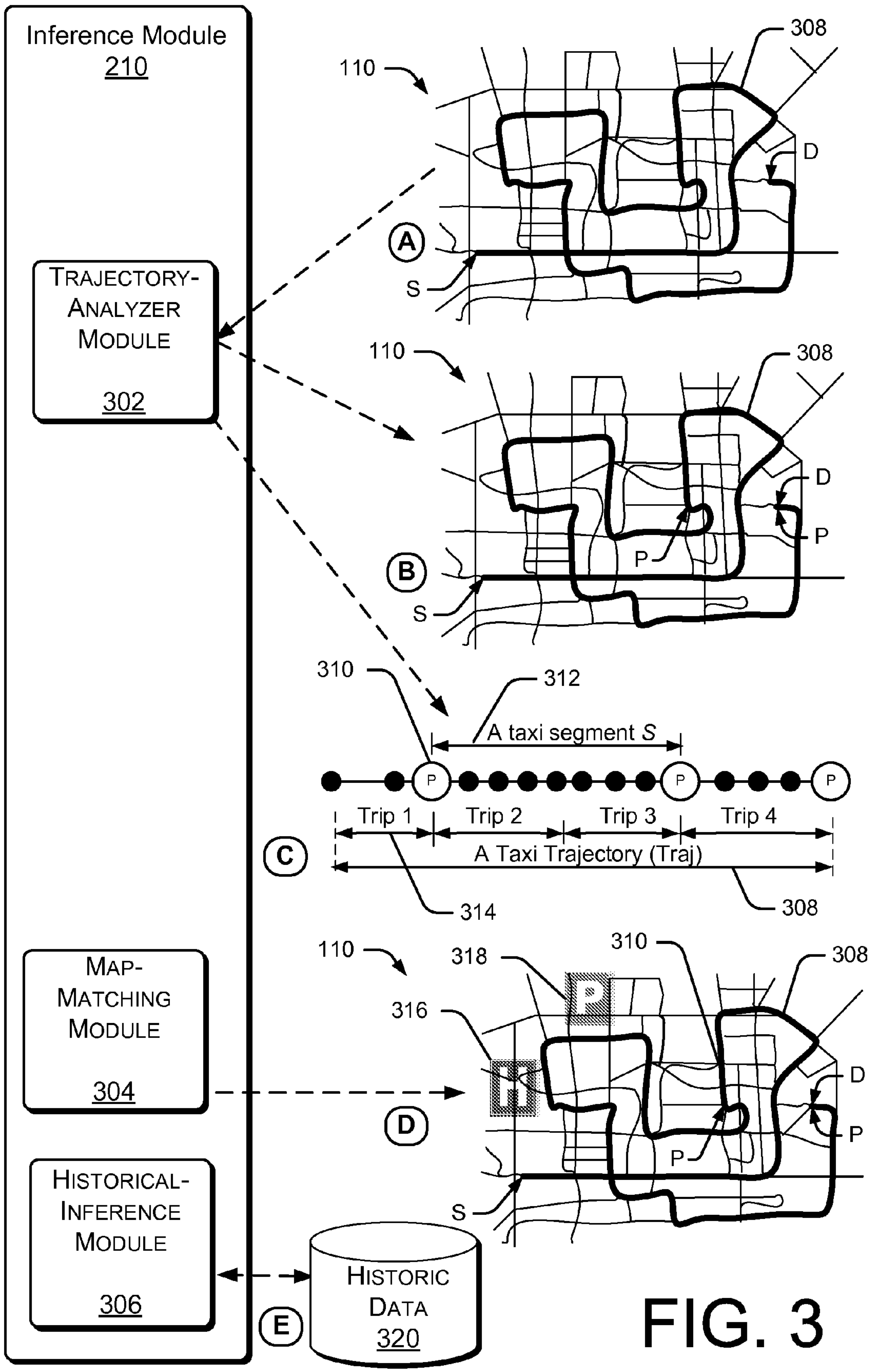
FIG. 3 illustrates select components of an example inference module from the computer of FIG. 2.

FIG. 3 illustrates select components of an example inference module 210. Example inference module 210 includes a trajectory-analyzer module 302, a map-matching module 304, and a historical-inference module 306. On the right hand side of FIG. 3 are logical views representing data and operations performed by each module. The logical views are for example purposes. The order in which each view is described is not intended to be construed as a limitation, and any number of the described operations associated with each module can be combined in any order. Additionally, some steps may be deleted from the logical operation without departing from the spirit and scope of the subject matter described herein As depicted in FIG. 3, trajectory-analyzer module 302 analyzes trajectory data 110 representing tracked positions of a vehicle along a trajectory 308 having a start point S and end point D. The raw data is represented logically in view A.

That is, trajectory data 110 is raw in view A, and does not provide an indication as to the behavioral state s of the vehicle such as P, N, or O. Trajectory data 110 may include spatio-temporal information indicating a vehicle's speed, position, and time at various points along the vehicle's trajectory 308.

Trajectory-analyzer module 302 may also identify one or more potential parking locations P of a vehicle along a trajectory as depicted in view B, and then parses the trajectory into taxi segments S 312 based (as depicted in view C of FIG. 3), at least in part, on the knowledge of the identified parking locations P. As shown in view C each taxi segment S 312 may include a plurality of different trips 314 within a segment 312, with multiple states yet to be determined.

As depicted in view D, map-matching module 504 maps the identified taxi segments or sub-segments to corresponding road networks or road segments within a road network. By using the mapped knowledge from geographical information related to each road network and point-of-interest (POI) such as a hospital 316 or park 318, it is possible to assign inference data to each taxi segment. For instance in one example, metadata may be assigned to a road network, including but not limited to, a (i) value associated with a highway indicative that a taxi cannot drop off or pickup passengers on the highway, or (ii) a value associated with road segments proximal to a POI or commercial area that a taxi is more likely than not to pick-up a passengers near these POIs or commercial areas.

As depicted in view E, historical-inference module 506 may access historical data representing spatio-temporal-travel patterns of vehicles learned from historical trajectories of vehicles corresponding to the map-matched-road segments. Additionally, historical-interface module 506 may mine other aspects of knowledge from historical trajectories, such as a passengers' travel patterns. That is, how long a passenger usually occupies a taxi, $P(O \rightarrow N|\Delta T)$, and how long a taxi would be non-occupied until picking up a passenger, $P(N \rightarrow O|\Delta T)$. Still further, historical-interface module 506 may access other aspects of knowledge from historical trajectories including a prior probability of a taxi being in a state, N or O, on a road segment. Specifically, historical-interface module 506 may map historical-taxi trajectories to a road network, and perform a statistical learning on the historical-taxi trajectories to obtain prior probabilities of a state on a road segment $r_i$, e.g., $P(N|r_i)$ and $P(O|r_i)$, and the transition probabilities between N and O given the taxi's transition between two road segments $r_i$ and $r_j$, i.e., $P(N \rightarrow O|r_i \rightarrow r_j)$ and $P(O \rightarrow N|r_i \rightarrow r_j)$. Note that, the temporal information is also considered in these aspects of knowledge, e.g., $P(O \rightarrow N|\Delta T, t)$, $P(N|r, t)$ and $P(N \rightarrow O|r_i \rightarrow r_j, t)$, where t is a timestamp.

However, due to limited coverage of the labeled datasets, there may not be sufficient samples (GPS points) for computing the priors for each road segment. For example, it is not possible to claim $P(O|r)=1$ if there are only two GPS points with a state of O on r. To address this problem, historical-interface module 506 may use a clustering algorithm (explained in more detail below), which groups similar road segments according to a road segment's physical features, such as length, in/out-degrees, and the POI distribution along the road. Because road segments from the same cluster may have similar pick-up and drop-off possibilities, it is possible to calculate the probabilities like $P(N|r)$ based on the samples aggregated from all the road segments in the cluster C, $r \in C$.

$P(N|C)$ is used to represent the probabilities of each road segment in C. Also, the transition probabilities, such as $P(O \rightarrow N|r_i \rightarrow r_j)$, are replaced by $P(O \rightarrow N|C_i \rightarrow C_j)$, where $r_i \in C_i$ and $r_j \in C_j$. A knowledge road graph may be built, where a node is a cluster of road segments and an edge is the transition probability between the clusters.

Thus, with the benefit of a learned road graph and travel patterns, it is possible for inference module 210 to serve as a probabilistic-inference model, which infers the behavior states of with each point in a taxi segment by choosing the sequence with a maximum probability.

Figure 4:
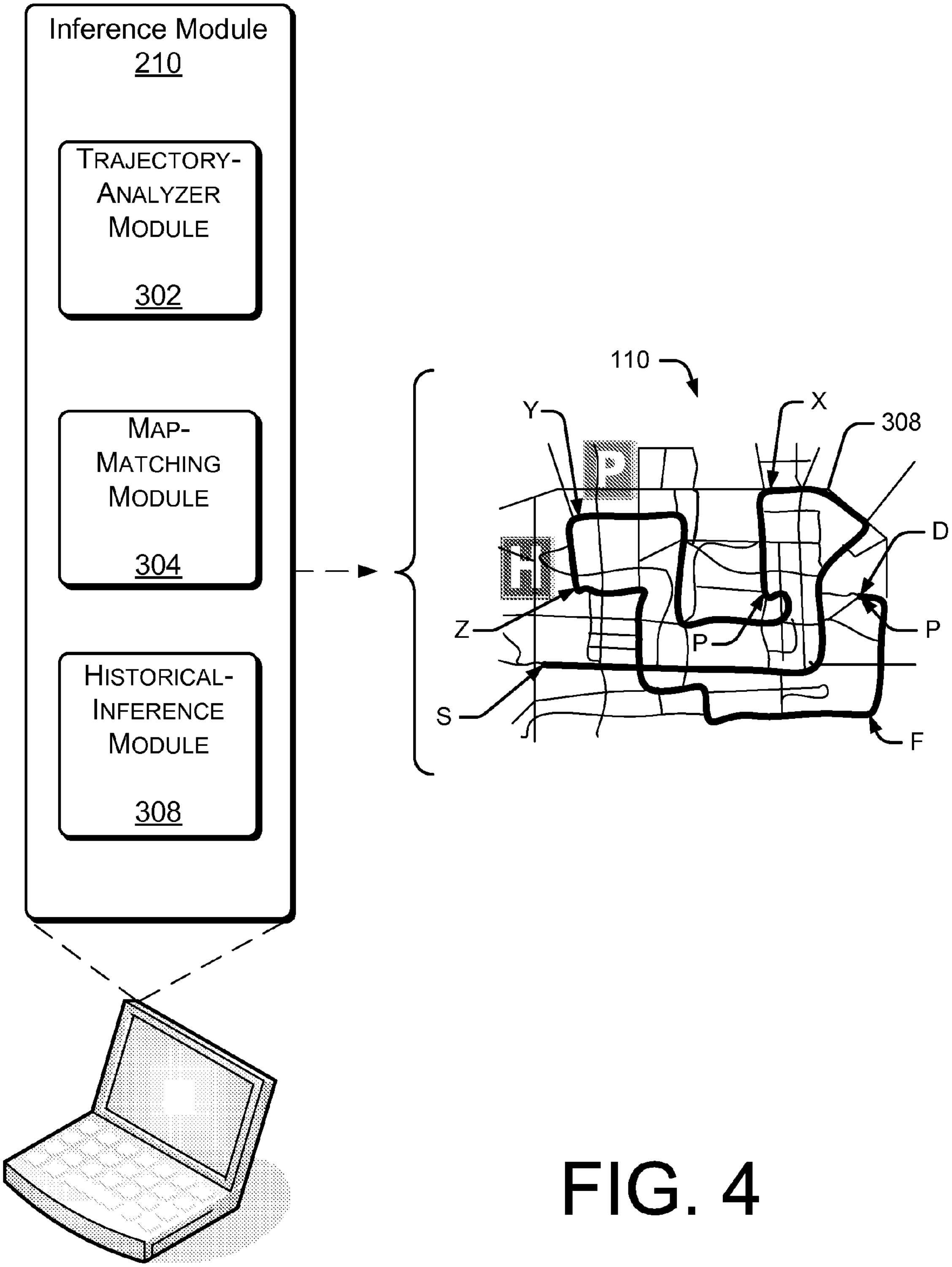
FIG. 4 shows a trajectory of an example vehicle (here, a taxi) after the inference module has automatically inferred behavior states of the taxi.

FIG. 4 shows a trajectory 110 of a taxi after inference module 210, automatically infers behavior states for the taxi. As depicted in FIG. 4, inference module 210 determined that a taxi first sent passengers to a location X, then drove to a parking location in an unoccupied state N. After waiting for a while, the taxi took another passenger(s) to the location Y, and maintained its non-occupied state N until reaching a location Z, where the taxi picked up passengers again.

Figure 5:
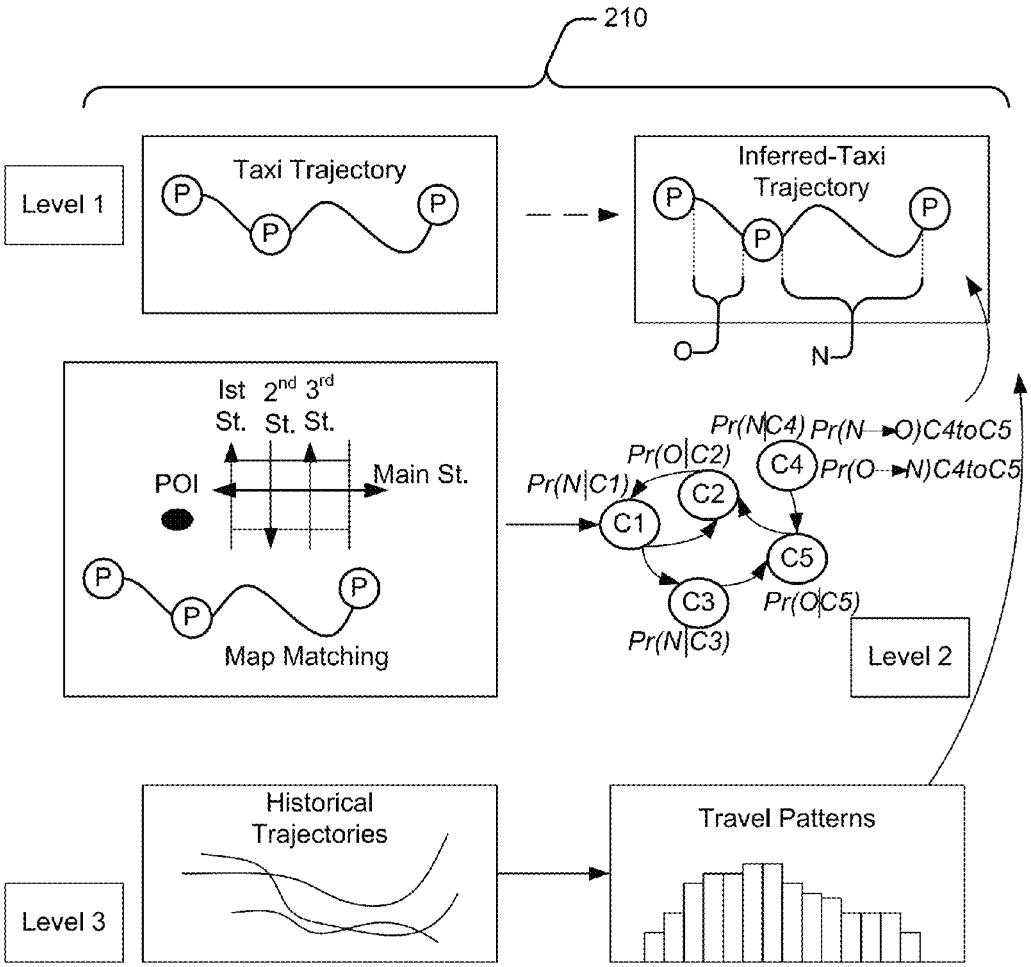
FIG. 5 shows an example architecture for implementing an inference module.

FIG. 5 shows an example architecture for implementing an interference module 210 such as depicted in FIGS. 3 and 4 and described herein. As shown in FIG. 5, inference module 210 analyzes data from three different levels: Level 1, Level 2, and Level 3. More or less levels of analysis may be used as would be appreciated by those skilled in the art with the benefit of this disclosure.

As depicted in FIG. 5, Level 1: (i) determines basic spatio-temporal information of a trajectory to be inferred, (ii) detects parking states, and (iii) reduces the complexity of an overall inference by partitioning a taxi trajectory into some short segments based on detected parking places.

Level 2 maps taxi segments to corresponding road segments (also known as "map-matching"), and analyzes the probability of the taxi being in state N and O on these road segments. Intuitively, map-matching implies commonsense knowledge supporting an inference. For example, taxis cannot drop or pick up passengers on a high way, and taxis are more likely to pick up passengers on some road segments close to commercial areas.

Level 3 mines two aspects of knowledge (data) from historical trajectories with state labels. The first-knowledge aspect mined from historical trajectories is taxis and passengers' travel patterns. The second-knowledge aspect mined from historical trajectories is the prior probability of a taxi being a state, N or O, on a road segment. More specifically, the historical taxi trajectories are mapped to the road network, and a statistical learning on the historical data is learned to obtain the prior probabilities of a state on a road segment $r_i$, e.g., $P(N|r_i)$ and $P(O|r_i)$, and the transition probabilities between N and O given the taxi's transition between two road segments $r_i$ and $r_j$, i.e., $P(N \rightarrow O|r_i \rightarrow r_j)$ and $P(O \rightarrow N|r_i \rightarrow r_j)$. Note that, the temporal information is also considered in these aspects of knowledge, e.g., $P(O \rightarrow N|\Delta T, t)$, $P(N|r, t)$ and $P(N \rightarrow O|r_i \rightarrow r_j, t)$, where t is a discretized timestamp.

Again, due to limited coverage of a labeled dataset, each road segment may not have sufficient samples (GPS points) for computing the priors. For example, it may be difficult to claim $P(O|r)=1$ if there are only two GPS points with a state of O on r. To address this problem, a clustering algorithm (explained below) may be performed. The clustering algorithm groups similar road segments according to a road segment's physical features, such as length, in/out-degrees and the POI distribution along the road. With the knowledge-road graph and travel patterns, a probabilistic inference model 210 may be implemented, that infers the states of each point in a taxi segment by choosing the sequence with the maximum probability of being occupied, not occupied or parked.

Example Parking-Place Detection

As described above, trajectory-analyzer module 302 (FIG. 3) (and level 1 of FIG. 5) performs parking-place candidates. In one embodiment, a density-based-clustering algorithm may be used to fully or partially implement trajectory-analyzer module 302. FIGS. 6A, 6B, 6C, and 6D illustrate a logical representation of a density-based-clustering algorithm. Further, a process flow for an example density-based clustering algorithm is shown in Table 1 below.

TABLE 1

| ParkingPlaceDetection ($G_r$, Traj, δ, τ, ε) |
|---|

```
Input: A road network G_r, a trajectory Traj, distance
threshold δ, time threshold τ and speed threshold ε.
Output: A set of candidate parking place Pk = {c}
 1. i ← 0, M ← |Traj|, c ← Ø, Pk ← Ø;
 2. while i < (M − 1) do
 3. |   if (p_i.v > ε) then
 4. |       i ← i + 1; continue;
 5. |   j ← i + 1; flag ← false;
 6. |   while j < M do
 7. |   |   dist ← Distance (p_i, p_j);
 8. |   |   if dist < δ and p_j.v < ε then
 9. |   ⌊       j ← j + 1; flag ← true;
10. |       else break;
11. |   if (p_{j−1}.t − p_i.t) > τ and flag = true
12. |   ⌊   foreach point p ∈ Traj[i,j) ∧ p ∉ Pk do
13. ⌊           c.Add (p); //build a candidate place
14.     if i = (j − 1) then
16.         Pk.Add(c); c ← Ø; //a parking
15.     i ← i + 1;
16. return Pk;
```

Figure 7A:
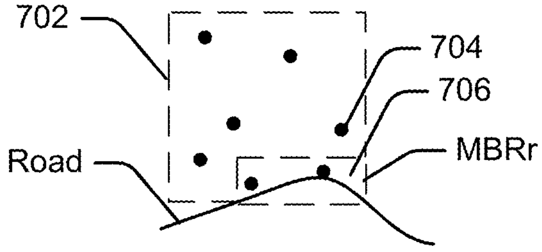
FIGS. 7A and 7B illustrate logical representations of a filtering algorithm to reduce false positives of parking-place locations.
Figure 7B:
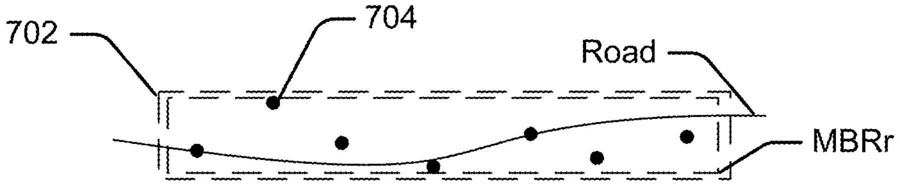

Filtering of false candidates caused by traffic jams or traffic lights from the candidate set determined by the density-based-clustering algorithm may be performed, after a density-based-clustering algorithm (or suitable alternative process) is performed. A logical representation of an example filtering algorithm is depicted in FIGS. 7A and 7B. An example process flow for the filtering algorithm is shown in Table 2 below.

TABLE 2

| FilterParking (Pk, $G_r$, γ) |
|---|

```
Input: A set of candidate Parking places Pk, Road
       Network G_r, and a ratio threshold γ,
Output: A real parking place collection Pk = {c}.
 1.   Index←SpatialIndexing (G_r);
 2.   foreach candidate parking place c ∈ Pk;
 3    |   MBR_c ← MinimalBoundingRect(c);
 4.   |   R ← search(Index, MBR_c, l);
      |   //find the road segments of level l
      |   // and intersecting MBR_c;
 5.   |   foreach road segment r ∈ R
 6.   |   |   Θ ← the points p ∈ r and inside MBR_c;
 7.   |   |   MBR_r ← MinimalBoudingRect(Θ);
 8.   |   |   Compute Γ ← area (MBR_r) / area (MBR_c);
 9.   —   |   if (Γ > γ) then
10.       —       Pk · remove (c); break;
11.       return Pk;
```

The density-based-clustering algorithm will now be explained in more detail. FIGS. 6A, 6B, 6C, and 6D illustrate a parking place candidate detection algorithm that may be used trajectory-analyzer module 302. Suppose there is a taxi trajectory ($p_1 \rightarrow p_2 \rightarrow \ldots \rightarrow p_7$). First, a speed is checked at each point, and the distance between consecutive points until both values (speed and distance) are smaller than a corresponding threshold.

Figure 6A:
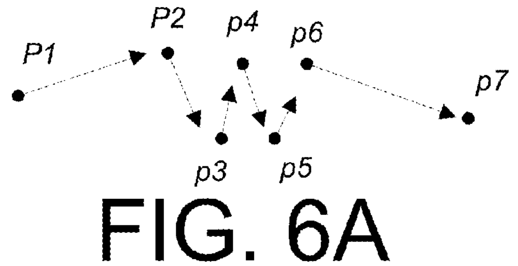
FIGS. 6A, 6B, 6C, and 6D illustrate logical representations of a density-based-clustering algorithm.
Figure 6B:
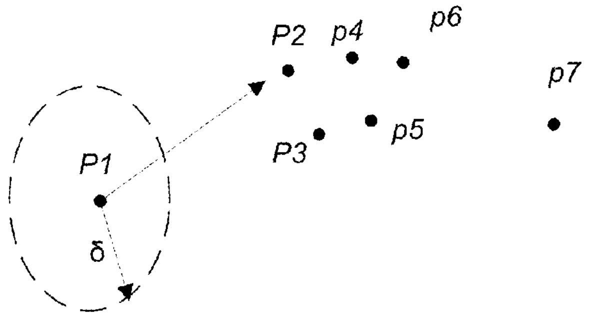
Figure 6C:
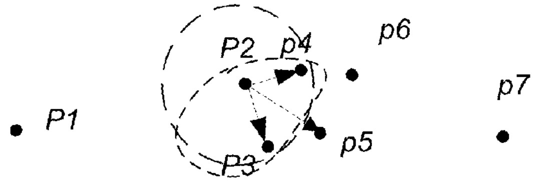

As depicted in FIG. 6B, $p_1$ and $p_2$ cannot formulate a parking place as the distance between them dist($p_1$, $p_2$) exceeds the corresponding threshold δ. Next, $p_2$ is analyzed to find that dist($p_2$, $p_3$)<δ, dist($p_2$, $p_4$)<δ while dist($p_2$, $p_5$)>δ (FIG. 6C)). If the speed values of these three points are less than the threshold and the time interval between $p_2$.t and $p_4$.t is larger than the time threshold τ, the three points form a small cluster represent a parking place candidate.

Figure 6D:
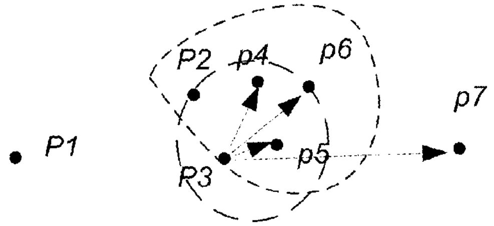

However, the points might not represent an entire set of the points in this parking place. Therefore, the parking-place-candidate points are expanded by continuously checking a distance between $p_3$ and the remaining points in the trajectory ($p_4$, $p_5$, $p_6$, $p_7$). As depicted in FIG. 6D, $p_5$ and $p_6$ are added into the parking set, because they also meet the speed, distance, and time interval constraints. Finally, points ($p_2$, $p_3$, $p_4$, $p_5$, $p_6$) are detected as a parking-place candidate because the cluster cannot be expanded further, i.e., all the points in the cluster have a distance farther than δ to $p_7$.

As shown, an example suitable algorithm detects locations where the GPS points of a taxi are densely clustered, with spatial, temporal and speed constraints. The example algorithm can detect locations where a taxi remains stationary, such as a taxi stand, and the queue-structured regions in which a taxi keeps on moving forward slowly, like a taxi queue in an airport.

However, a parking-place candidate may sometimes correspond to taxis stuck in traffic jams, or waiting for signals at a traffic light, instead of a parking location. To reduce such false positives, a filtering algorithm may be used that differentiates between real-parking places close to a street from the above-mentioned scenarios, as illustrated in FIGS. 7A and 7B.

Intuitively, a minimal bounding box ($MBR_c$) 702 of the GPS points 704 generated in a real parking place 706 close to a street could have some spatial overlap ($MBR_r$ denoted as the gray box) with the street. However, the ratio Γ between $MBR_r$ and $MBR_c$ shown in FIG. 7A could be much smaller than that of the traffic jam depicted in FIG. 7B, where a taxi moves slowly on a road, creating GPS points which are distributed along the road. In short, if Γ is larger than a threshold γ, the parking place candidate is removed from the list of potential candidates. Thus, based on a labeled-parking-place dataset, it is possible to learn a proper value for δ, , τ, and γ, ensuring high precision and recall of detected parking places.

Example Map Matching

As described above, map-matching module 304 (FIG. 3) (and Level 2 of FIG. 5) maps taxi segments to the most likely road segments. In one embodiment, an interactive-voting-based-map-matching (IVMM) algorithm may be used as an element to fully or partially implement map-matching module 304.

In one aspect, IVMM algorithm maps GPS points from a taxi segment to the most likely road segments, and will with low-sampling-rate trajectories. As a result, an individual GPS-taxi trajectory is transformable into a sequence of road segments.

To infer the state of a given taxi trajectory, empirical insights on cruising patterns of taxis from the historical data is useful. For example, it is possible to focus on learning two travel patterns:

1) $Pr(O \rightarrow N | \Delta t_O, t)$: indicates the state transition probability of a taxi transitioning from O to N conditioned on the fact that the taxi has been occupied for a time duration $\Delta t_O$, starting at time t. This pattern is usually determined by a passenger's travel behavior.

2) $Pr(N \rightarrow O | \Delta t_N, t)$: indicates the state transition probability of a taxi transitioning from N to O conditioned on the fact that the taxi has been non-occupied for a time duration $\Delta t_O$, starting at time t discretized by hours.

Example Historic Knowledge Base

Historical-inference module 306 (FIG. 3) (and Level 3 of FIG. 5) may use a knowledge-road graph to identify following features derived from the underlying road structure and POIs such as:

(1) L: The actual length of a road segment.

(2) L/E: The ratio between L and the Euclidean length (between the terminal points) E of a road segment. The larger the value, the more tortuous the road segment is.

(3) dir: The directionality of a road segment, i.e., one-way or two-way.

(4) Lanes: The number of lanes in a given road segment (single or multiple lanes).

(5) Degree: Given a road segment r, the in-degree of the start node ($d_{sin}$) is defined as the number of directed edges terminating at node s, while the out-degree of the start node ($d_{sout}$) as the number of directed edges originating at node s. Similarly, the in-degree and out-degree for the terminal node is defined as e as $d_{ein}$ and $d_{eout}$. Note that when computing the degree of a road segment, it is possible to take into account its directionality(r.dir).

(6) POI: The distribution of POIs along a road segment r is also considered. In one aspect, POIs falling in the minimal bounding box of r and within a certain perpendicular distance to r, are considered. For each road segment, a POI vector, $<f_1, f_2, \ldots, f_n>$, is formulated in which an item $f_i$ represents the TF-IDF value of a POI category i, like restaurants and shopping malls, along the road segment.

$$f_i = \frac{n_i}{N} \times \log\frac{|R|}{|\{\text{Road segments containing } i\}|}, \quad (1)$$

Where $n_i$ is the number of POIs of category i along r and N stands for the total number of POIs along r. The second part of Equation 1 denotes the inverse location frequency of a category, in which |R| is the number of road segments in the road network. In other words, a POI category (e.g., "museum" and "nature parks") that occurs rarely in other regions is more representative for the region than a common POI category, e.g., "restaurant", which could appear in many places.

Features identified above may have a strong correlation with taxis' travel patterns and subsequently their pick-up and drop-off locations. So, it possible to conclude that road segments with similar features have similar traffic flow, and human mobility patterns, and will therefore behave similarly in space and time.

An example, historical-inference module 306 may also use a bisective-clustering algorithm (or other suitable algorithm), which respectively groups the road segments of the same level into a certain number of clusters according to the above-defined features. This algorithm is based on K-means (with K=2) clustering and is performed recursively.

All the road segments may be partitioned into two respective clusters {left, right} by using a 2-mean clustering algorithm. Now, for each cluster C∈{left, right}, keep on subdividing the cluster C via 2-means unless and until the total of samples (GPS points) inside C≦. Typically, this clustering is only performed on road segments with the same level, e.g., r. level=2.

It is also possible to combine bisective-clustering techniques with statistical learning.

Given clustered road segments and the processed taxi trajectories, statistical learning is performed to help determine the following two types of prior probabilities: "emission probability" and "transition probability."

"Emission Probability" indicates the probability of a taxi to be in state s conditioned on the fact that it is presently traveling on road segment r at time t. Each road segment of a given road level is typically mapped to a specific cluster. This emission probability is denoted as $Pr(s|r \rightarrow C, t)$, s∈{N, O}.

$$Pr(s \mid r \rightarrow C, t) = \frac{\sum_{r \in C} r \cdot \text{Num}(s)}{\sum_{r \in C} r \cdot \text{Num}(\text{All})}; \quad (2)$$

where r.Num (s) is the number of GPS points generated at time t and with a label state s on road segment r, and r.Num (All) means number of all the points on r at time t.

Figure 8:
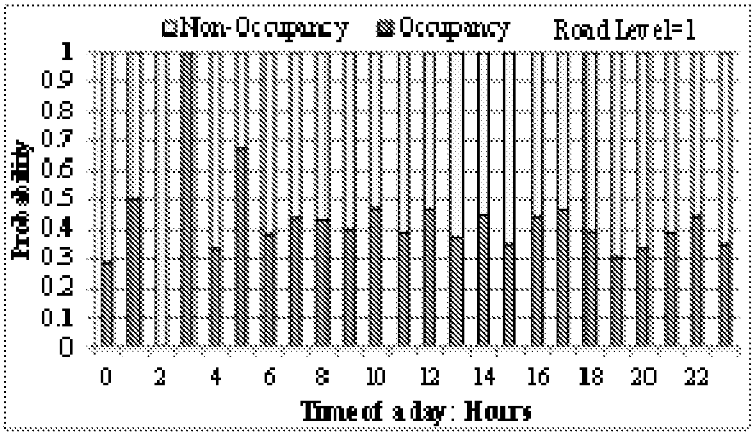
FIG. 8 shows charts showing emission probabilities, learned from the labeled trajectories, of two road segments of levels 1 and 2, respectively.
Figure 8:
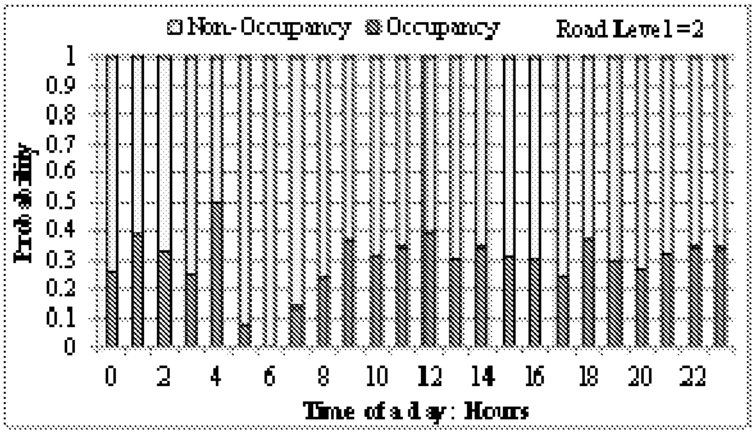

FIG. 8 shows the emission probabilities, learned from the labeled trajectories, of two road segments of different levels: 1 and 2, respectively. First, the probabilities of the same road segment vary in times of day. The reason for Pr(O) being higher in time slot 3-4 AM than others is that drivers usually do not cruise empty in the middle of the night. Instead, they shut down their taxis or join a taxi queue or opt to sleep for a while, till they get a passenger on board. Second, taxis traveling on the road segment of level 1 (representing ring roads) have a higher probability of being occupied than that of level 2 (representing service roads). This result matches common-sense knowledge that taxi drivers would not actively take the ring roads when non-occupied. Since pedestrians are not allowed to walk on these roads in the example city, it is not possible to pick-up passengers there.

Transition Probability indicates the probability of a taxi, transitioning from $s_i$ to $s_j$. It is the production of the following two parts, i.e., Pr(T)×Pr(D).

1) Travel Pattern Pr(T) indicates the state transition probability of a taxi transferring from $s_i$ to $s_j$ conditioned on the fact that the taxi has spent a time duration $\Delta t_{s_i}$ at state $s_i$, starting at time $t_i$, $Pr(s_i \rightarrow s_j | \Delta t_{s_i}, t_i)$.

2) Destination Pr(D): In this example, there are three kinds of Pr(D) applying to different parts of a taxi segment.

$Pr(P \rightarrow s | \Delta t_p, r \rightarrow C, t_a)$: For taxis originating from a parking place $P_{from}$, the probability of transitioning to $s \in \{N, O\}$ depends on the duration it has spent on parking $\Delta t_p$, the location of parking place r (which is mapped to a road segment cluster C), and the time of arrival at the parking place $t_a$. This transition probability is typically applied to the first point next to a parking place. It has been observed that the time spent in parking for potential passengers has strong temporal correlations with the immediate next state just after parking; and it is one of the main reasons to model parking as a separate state in our inference model.

$Pr(s_j \rightarrow s_j | r_i \rightarrow r_j => C_i = C_j, t_i)$: indicates the state transition probability of a taxi transitioning from $s_i$ to $s_j$, $s_j$, $s_j \in \{N, O\}$, conditioned on the fact that it has traversed from road segment $r_i$ to $r_j$ at time $t_i$, where $r_i \in C_i$ and $r_j \in C_j$.

$Pr(s \rightarrow P | t, r \rightarrow C)$: For taxis terminating to a parking place, the transition probability of a taxi transferring from $s \in \{N, O\}$ to P depends on the timestamp t of the taxi with state s and the location of parking place (first represented by a road segment r and then transferred to a cluster C). This probability is typically applied to the point immediately before a parking place. Note that $P_{to}$ will be a $P_{from}$ for the next segment.

Figure 9:
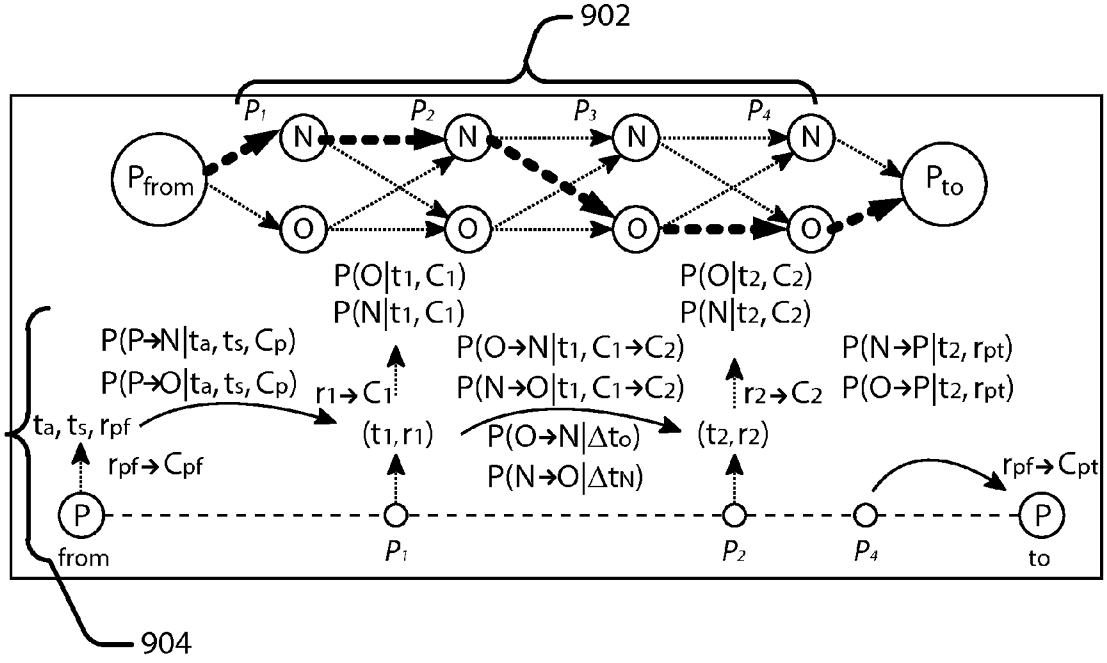
FIG. 9 shows an example knowledge-road graph.

Given the learned parameters and clustering, it is possible to construct a knowledge-road graph. For instance, FIG. 9 shows an example knowledge-road graph.

Specifically, the example knowledge-road graph is defined as a weighted directed graph $G_k=(V_k, E_k)$, where each vertex $v \in V_k$ represents a cluster C which is assigned a emission probability of $Pr(s \uparrow r \in C)$, $s \in \{N, O\}$. And, each edge is represented by $E=\{(v_i, v_j) | r_i \in C_i \text{ and } r_j \in C_j\}$, which is assigned a transition probability of $\Sigma_{r_i \in C_i, r_j \in C_j} Pr(s_i \rightarrow s_j | r_i \rightarrow r_j)$, $s_i$, $s_j \in \{N, O, P\}$.

Example Inference Operation

As mentioned above, inference module 210 infers the state of a taxi at any given point in time and space. As illustrated in FIG. 9, a taxi segment, $p_1 \rightarrow p_2 \rightarrow p_3 \rightarrow p_4$ 902 is accessed. After parking place detection there is an originating and terminating parking place $P_{form}$ and $P_{to}$, respectively. As shown in FIG. 9, each GPS point in the taxi segment has two possible states, O and N. That is, there may be four possible edges (N→N,N→O,O→O,O→N) between the states of two consecutive points. By connecting all the possible edges, it is possible to formulate an inference graph (formally defined below).

Also, as shown in FIG. 9, emission probabilities, $Pr(s_i | r_i \rightarrow c_i, t_i)$, $s_i \in \{N, O\}$ 904 are assigned to each point in the inference graph, and the transition probabilities are allocated to corresponding edges. More specifically, $Pr(P \rightarrow s | \Delta t_p, r \rightarrow C, t_a)$, $s \in \{N,O\}$ is assigned to the edge connecting the $P_{form}$ and $p_1$, $Pr(s \rightarrow P | t, r \rightarrow C)$, $s \in \{N,O\}$ is allocated to the edge directing from $p_4$ to $P_{to}$, while the rest of edges are assigned with $Pr(s_i \rightarrow s_j | r_i \rightarrow r_j => C_i \rightarrow C_j, t_i)$, $s_i \in \{N,O\}$.

As described above, these probabilities can be learned from the labeled taxi trajectories. For example, $p_1$ generated at time $t_1$ is mapped to road segment $r_1$ after map-matching. By searching the knowledge road graph, $r_1$ is found to belong to road segment cluster $C_1$. So, it is possible set the probability on $r_1$ using the cluster-based probabilities, e.g., $Pr(O|r_1, t_1) \leftarrow Pr(O|C_1, t_1)$.

Inference Graph: Given a taxi segment, Traj: $p_1 \rightarrow p_2 \rightarrow \ldots \rightarrow p_k$, an inference graph $G_I=(V_I, E_I)$ corresponding to Traj is a directed graph, where Vertex set $V_I$ is $\{p_{from}, p_{to}\} \cup V_O \cup V_N$ given that $P_{from}$ and $P_{to}$ represent taxi's originating and terminating parking states (P) respectively. Additionally, set $V_O=\{O_1, \ldots, O_k\}$ and $V_N=\{N_1, \ldots, N_k\}$, denotes the collection of states of the taxi in occupied (O) and non-occupied state (N) respectively.

Edge set $E_I$ contains three kinds of edges amongst the vertices set: 1) $P_{from}$ to $\{O_1, N_1\}$, 2) $\{(s_i, s_{i+1}) | s_i - \{O,N\}, i \in [1, k-1]\}$, and 3) $\{O_k, N_k\}$ to $P_{to}$.

Given a map-matched taxi segment and the inference graph, the probabilities on each node and edge (in the graph) are computed. Then, the problem of deriving the most probable state sequence for the segment $p_1 \rightarrow p_2 \rightarrow \ldots \rightarrow p_k$ is formulated as deriving a state sequence $S_{1 \ldots k}$: $s_1 \rightarrow s_2 \rightarrow \ldots \rightarrow s_k$ such that:

$$S_{1 \ldots k} = \operatorname{argmax}_{S_{1 \ldots k}} \prod_{i=1}^{k} W_V(s_i) \times W_e(s_i \rightarrow s_{i+1}); \tag{3}$$

$$W_v(S_i) = Pr(S_i | r_i \rightarrow c_i, t_i), S_i \in \{O, N\}; \tag{4}$$

$$W_e(S_i \rightarrow S_{i+1}) = Pr(D) * Pr(T); \tag{5}$$

where $W_v(\cdot)$ and $W_e(\cdot)$ denotes the vertex weight and edge weight respectively. Pr(D) is the destination-based transition probability, and Pr(T) stands for the travel patterns (as discussed above).

A standard dynamic programming is applied to infer and derive the possible taxis' state sequence $S_{1 \ldots k}$. In other words, the state sequence problem can be formulated as finding the longest path in a directed weighted acyclic graph, see the bolded-dashed line in FIG. 9.

It is also appreciated that an inference module can also handle a situation when taxi segments do not begin and end with a parking place (for instance, when a taxi starts the day with non-occupied, or when a taxi ends its day returning empty to its residence) by skipping the edge from $P_{form}$ and to its immediately next point, or the edge directing to $P_{to}$ from the last point of the trajectory.

Figure 10:
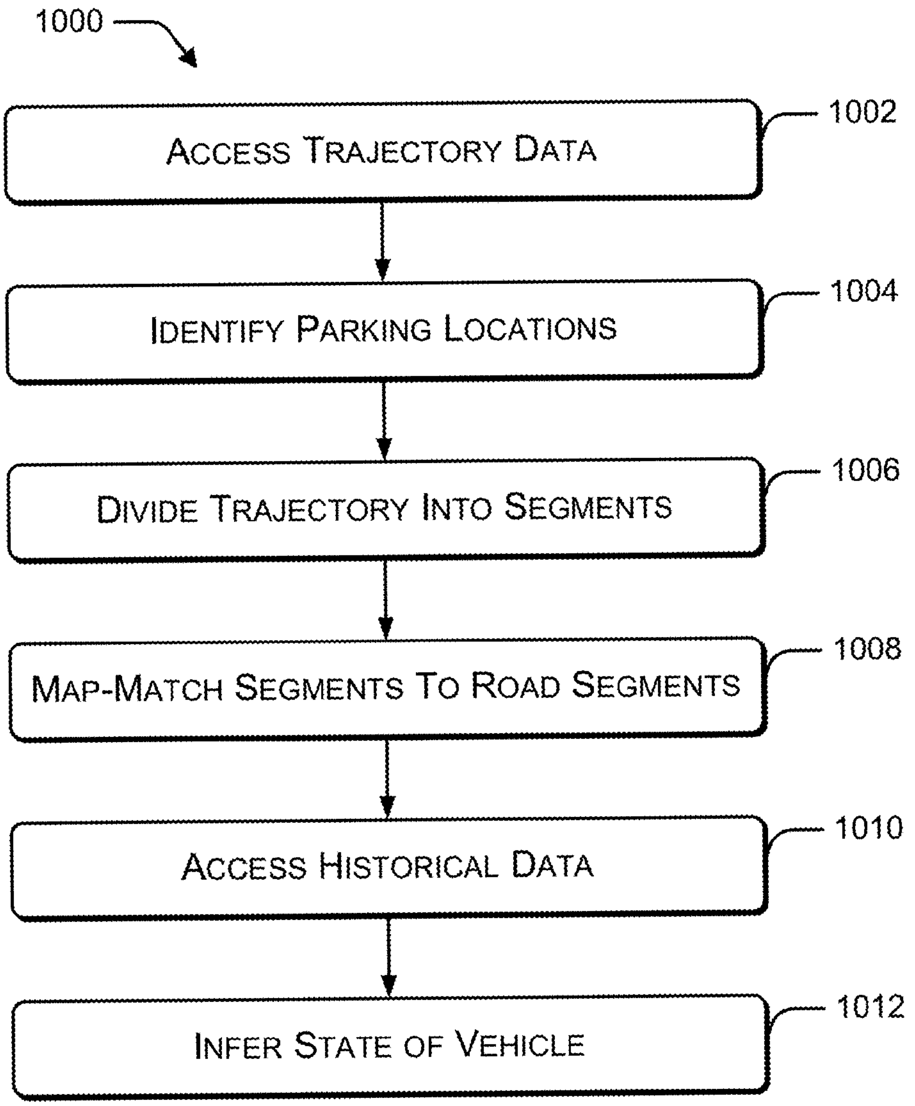
FIG. 10 illustrates an example method for inferring the behavior state of a vehicle, such as a taxi.

FIG. 10 illustrates an example method 1000 for inferring the behavior state of a vehicle such as a taxi. Method 1000 includes operational blocks 1002, 1004, 1006, 1008, 1010, and 1012. The method is illustrated as collections of blocks in logical flow graphs, which represent sequences of operations that can be implemented in hardware, software, or a combination thereof. In the context of software, the blocks represent computer-executable instructions (or code) stored on one or more computer storage media that, when executed by one or more processors, cause the processors to perform the recited operations. Note that the order in which the method is described is not intended to be construed as a limitation, and any number of the described method blocks can be combined in any order to implement the illustrated method, or alternate methods. Additionally, individual blocks may be deleted from the method without departing from the spirit and scope of the subject matter described herein. Further, while the method is described with reference to computer 108 described above with reference to FIG. 1, other computer architectures may implement one or more portions of this method, in whole or in part.

Referring to FIG. 10, in block 1002 trajectory data representing tracked positions of a vehicle along a trajectory having a start and end point is accessed. For example, inference module 210 (FIG. 2) may access trajectory data 110 from memory 112. Trajectory data may include spatio-temporal information indicating a vehicle's speed, position, and time at various points along the vehicle's trajectory.

In block 1004, one or more parking locations of the vehicle along a trajectory are identified. For example, inference module 210 identifies when a speed and distance between one or more consecutive points along a trajectory is less than a predefined threshold.

In block 1006, the trajectory is divided in segments, based at least in part, on knowledge of the identified parking locations from block 204. For example, by dividing a trajectory into short segments bounded by one more detected-parking places, reduces the complexity of an overall inference.

In block 1008, the segments are map-matched to corresponding road segments. As part of the map-matching process attributes associated with a road segment. Such attributes may include metadata indicative of whether the road segment is a highway, one-way road, two-way road, single-lane or multiple-lane road, a length of the road, a point-of-interest, or other suitable attribute information.

In block, 1010 historical data representing spatio-temporal-travel patterns of vehicles learned from historical trajectories of vehicles corresponding to the map-matched-road segments are accessed. Such historical data may include prior probabilities that the vehicle transitions from (i) a first-behavioral state—in which the vehicle is occupied by a passenger—to (ii) a second-behavioral state in which the vehicle is unoccupied by a passenger—and vice versa. The historical data may also include the probability of a taxi to be in state s conditioned on the fact that it is presently traveling on a road segment r at time t. Accessing historical data may also include mining data corresponding to similar road segments with similar features and similar traffic flow at specific times of day.

In block 1012, a behavior state of the vehicle for a segment or position within a segment is inferred. Again, the inference is performed based at least in part, on (i) the position, time of day, and speed of the vehicle corresponding to the segment or position within a segment, (ii) knowledge of the map-matched-road segment, and (iii) the historical data.

Conclusion

Reference herein to "one embodiment", "an embodiment", or similar formulations, means that a particular feature, structure, operation, or characteristic described in connection with the subject matter of this disclosure, is included in at least one embodiment. Thus, the appearances of such phrases or formulations herein are not necessarily all referring to the same embodiment. Furthermore, various particular features, structures, operations, or characteristics may be combined in any suitable manner in one or more embodiments.

Although the subject matter has been described in language specific to structural features and/or methodological operations, it is to be understood that the subject matter defined in the appended claims is not necessarily limited to the specific features or operations described. Rather, the specific features and acts are disclosed as example forms of implementing the claims.

What is claimed is:

1. A computer-implemented method, comprising:

under control of one or more computer systems containing memory and configured with executable instructions stored in the memory, accessing from the memory trajectory data representing tracked positions of a vehicle along a trajectory having a start point and an end point, the trajectory data including recorded times, and speed of the vehicle at different points along the trajectory;

identifying one or more potential parking locations of the vehicle along the trajectory;

dividing the trajectory into segments based, at least in part, on knowledge of the identified potential parking locations;

map-matching the segments to corresponding road segments;

accessing historical data stored in the memory representing spatio-temporal travel patterns of vehicles learned from historical trajectories of vehicles corresponding to the map-matched road segments;

automatically inferring, by the one or more computer systems, a behavioral state of the vehicle for a segment or position within a segment, based at least in part, on a position, time of day, and speed of the vehicle corresponding to the segment or position within the segment, knowledge of the map-matched-road segment, and the historical data;

repeating the accessing, identifying, map-matching, and inferring operations for a plurality of vehicles to identify trajectory data for the plurality of vehicles; and analyzing the trajectory data for the plurality of vehicles to attempt to identify a pattern, the analysis including detecting whether passengers of the plurality of vehicles travel between a first and second region at a frequency that is greater than a predefined threshold.

2. The method of claim 1, wherein the behavioral state of the vehicle includes at least one of: an occupied state in which the vehicle is transporting at least one passenger, or a non-occupied state in which the vehicle is traveling without a passenger.

3. The method of claim 1, wherein identifying the one or more potential parking locations includes detecting when a speed and distance between one or more consecutive points along the trajectory is less than a predefined threshold.

4. The method of claim 1, wherein map-matching the segments to corresponding road segments includes assigning an attribute associated with a road segment to the road segment.

5. The method of claim 1, wherein map-matching the segments to corresponding road segments includes assigning an attribute associated with a road segment to the road segment, wherein the attribute includes metadata indicative of (i) whether the road segment is a highway, a one-way road, a two-way road, a single-lane road, a multiple-lane road; (ii) a length of the road segment, and/or (iii) a point-of-interest along the road segment.

6. The method of claim 1, wherein the behavioral state of the vehicle is further automatically inferred based at least in part on past behavior patterns of passengers of vehicles according to the historical data.

7. The method of claim 1, wherein accessing the historical data further includes mining a prior probability that the vehicle will be in a certain behavioral state corresponding to a map-matched-road segment.

8. The method of claim 1, wherein accessing the historical data further includes mining a prior probability that the vehicle will be in a certain behavioral state based on the spatial-temporal relationship of the vehicle corresponding to a map-matched-road segment.

9. The method of claim 1, wherein the accessing of the historical further includes accessing prior probabilities that the vehicle transitions from (i) a first-behavioral state, in which the vehicle is occupied by a passenger, to (ii) a second-behavioral state, in which the vehicle is unoccupied by a passenger, and vice versa.

10. The method of claim 1, further comprising tracking the vehicle's position from a receiver mounted on or in the vehicle.

11. The method of claim 1, wherein the vehicle is a service vehicle for transporting passengers.

12. The method of claim 1, wherein the vehicle is a taxi.

13. The method of claim 1, further comprising analyzing whether a pattern is detected, the analysis including detecting whether roads connecting two locations are heavy with frequent traffic jams at specific times of day.

14. One or more computer storage media encoded with computer-executable instructions that, when executed, configure a computer system to perform a method as recited in claim 1.

15. A computer-implemented method, comprising:

under control of one or more computer systems containing memory and configured with executable instructions stored in the memory, determining a trajectory of a vehicle based at least in part on trajectory data representing tracked positions of the vehicle, the trajectory data including recorded times, and speed of the vehicle at the positions along the trajectory;

accessing previously-recorded traffic patterns of vehicles along the trajectory; and inferring, by the one or more computer systems, a state of the vehicle based at least in part on the trajectory and the previously-recorded traffic patterns, the state of the vehicle including at least one of: an occupied state, in which the vehicle is transporting a passenger, and a non-occupied state, in which the vehicle is traveling without a passenger.

16. The method of claim 15, further comprising selecting trajectory data associated with the vehicle when in an occupied state in lieu of trajectory data associated with the vehicle when in a non-occupied state.

17. A system, comprising:

one or more processors;

a memory communicatively coupled to the one or more processors; and an application at least partially stored in the memory and executable on the one or more processors, the application including:

a first module configured to process a trajectory of a vehicle based at least in part on a tracked position of the vehicle, the tracked position of the vehicle including spatial-temporal data; the first module further configured to identify one or more potential parking locations of the vehicle along the trajectory and divide the trajectory into segments based, at least in part, on knowledge of the identified potential parking locations;

a second module configured to map-match attributes from the segments to corresponding road segments;

a third module configured to access historical data representative of previously-recorded traffic patterns of vehicles along the trajectory; wherein the first, second, and third, modules form a collective module configured to infer a state of the vehicle based on the spatio-temporal data associated with the trajectory, map-matched attributes, and the historical data, the state of the vehicle including at least one of: an occupied state in which the vehicle is transporting at least one passenger, and a non-occupied state in which the vehicle is traveling without a passenger.

18. The system of claim 17, wherein the application is further configured to select trajectory data associated with the vehicle when in an occupied state in lieu of trajectory data associated with the vehicle when in a non-occupied state.

19. The system of claim 17, further comprising one or more modules configured to:

repeat the processing, map-matching, accessing, and inferring operations for a fleet of vehicles to identify trajectory data for the fleet; and identify a pattern from the trajectory data for the fleet by detecting whether passengers of vehicles of the fleet travel between a first and second region at a frequency that is greater than a predefined threshold.

20. The method of claim 15, further comprising:

repeating the determining, accessing, and inferring operations for a fleet of vehicles to identify trajectory data for the fleet; and identifying a pattern from the trajectory data for the fleet by detecting whether passengers of vehicles of the fleet travel between a first and second region at a frequency that is greater than a predefined threshold.

* * * * *